(12) United States Patent
Shew

(10) Patent No.: US 8,896,208 B2
(45) Date of Patent: Nov. 25, 2014

(54) LIGHT ASSEMBLY

(76) Inventor: Larry N. Shew, Highland, MI (US)

( * ) Notice: Subject to any disclaimer, the term of this patent is extended or adjusted under 35 U.S.C. 154(b) by 137 days.

(21) Appl. No.: 13/417,169

(22) Filed: Mar. 9, 2012

(65) Prior Publication Data

US 2012/0169234 A1 Jul. 5, 2012

Related U.S. Application Data

(63) Continuation-in-part of application No. 12/983,227, filed on Dec. 31, 2010.

(60) Provisional application No. 61/450,825, filed on Mar. 9, 2011, provisional application No. 61/335,132, filed on Dec. 31, 2009.

(51) Int. Cl.
   H05B 37/02   (2006.01)
   H02J 9/06    (2006.01)
   H05B 33/08   (2006.01)

(52) U.S. Cl.
   CPC ............ *H02J 9/065* (2013.01); *H05B 37/0218* (2013.01); *H05B 33/0803* (2013.01); *Y02B 20/46* (2013.01)
   USPC .......................................... 315/88; 315/166

(58) Field of Classification Search
   CPC ....................................................... H05B 37/02
   USPC ............................................ 315/88, 160, 312
   See application file for complete search history.

(56) References Cited

U.S. PATENT DOCUMENTS

| | | | |
|---|---|---|---|
| 6,979,097 B2 | 12/2005 | Elam et al. ...................... 362/148 |
| 7,049,761 B2 * | 5/2006 | Timmermans et al. ....... 315/246 |
| 7,114,830 B2 | 10/2006 | Robertson et al. ............. 362/240 |
| 7,481,546 B2 * | 1/2009 | Nielson et al. .................. 362/20 |
| 7,507,001 B2 * | 3/2009 | Kit ................................. 362/276 |
| 7,510,299 B2 * | 3/2009 | Timmermans et al. ........ 362/225 |
| 7,686,470 B2 * | 3/2010 | Chiang .......................... 362/147 |
| 7,784,966 B2 | 8/2010 | Verfuerth et al. .............. 362/221 |
| 7,802,902 B2 | 9/2010 | Moss et al. ............... 362/249.02 |
| 7,905,626 B2 | 3/2011 | Shantha et al. ................ 362/228 |
| 8,136,958 B2 | 3/2012 | Verfuerth et al. .............. 362/221 |
| 8,214,084 B2 * | 7/2012 | Ivey et al. ...................... 700/275 |
| 8,319,437 B2 | 11/2012 | Carlin et al. ................... 315/113 |

(Continued)

OTHER PUBLICATIONS

U.S. Appl. No. 13/663,410, filed Oct. 19, 2012.

(Continued)

*Primary Examiner* — Don Le
(74) *Attorney, Agent, or Firm* — L.C. Begin & Associates, PLLC.

(57) ABSTRACT

The present invention includes one embodiment containing an LED lighting assembly containing: a troffer; a bulbless and/or tubeless sub-housing; one or more solid state lighting units contained within the troffer and actuated by alternating current power; a night light contained within the bulbless sub-housing and operably communicating with the solid state lighting units, the night light actuated in the absence of light from the solid state lighting units; one or more light emitting diodes contained within the night light; and a battery source for powering the night light in the event of power interruption.

In yet another embodiment of the invention, a replaceable lighting unit contains: a bulbless and/or tubeless sub-housing. One or more light emitting diodes are contained within the sub-housing. A battery source may be contained within the sub-housing, and the battery source may be configured to selectively power the light emitting diodes with direct current energy.

20 Claims, 16 Drawing Sheets

(56) References Cited

U.S. PATENT DOCUMENTS

| | | | |
|---|---|---|---|
| 8,444,292 B2* | 5/2013 | Ivey et al. | 362/225 |
| 8,454,193 B2* | 6/2013 | Simon et al. | 362/217.17 |
| 2005/0225979 A1* | 10/2005 | Robertson et al. | 362/240 |
| 2007/0047243 A1 | 3/2007 | Hacker et al. | 362/382 |
| 2012/0195032 A1 | 8/2012 | Shew | 362/183 |
| 2012/0206909 A1* | 8/2012 | Morgan | 362/217.16 |
| 2013/0051008 A1 | 2/2013 | Shew | 362/235 |
| 2013/0294059 A1* | 11/2013 | Galluccio et al. | 362/218 |

OTHER PUBLICATIONS

U.S. Appl. No. 13/802,187, filed Mar. 13, 2013.

* cited by examiner

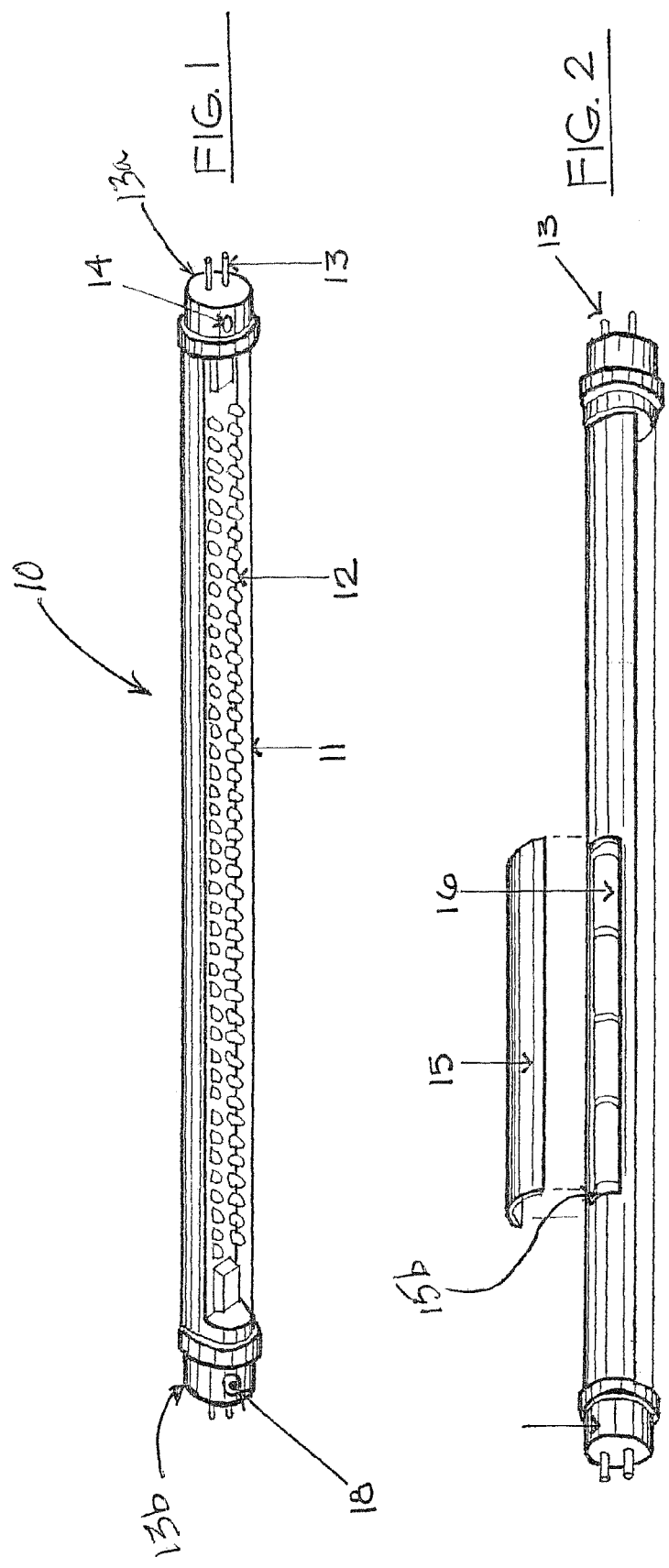

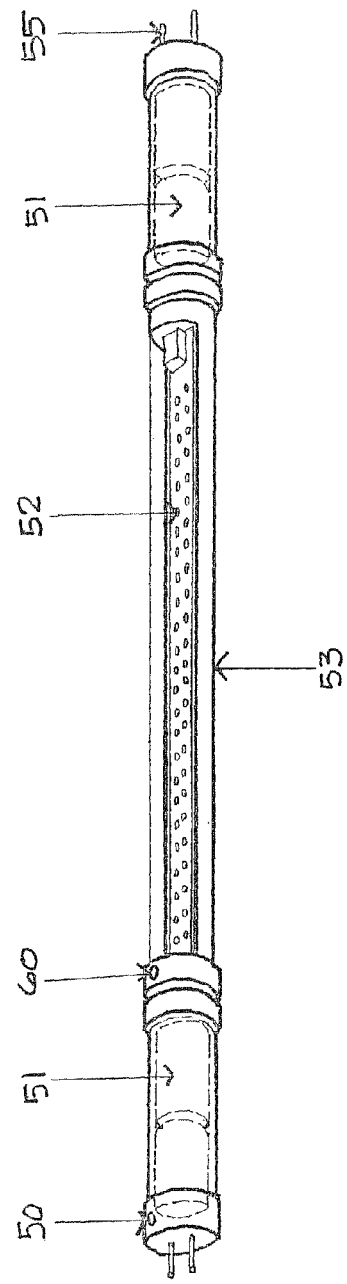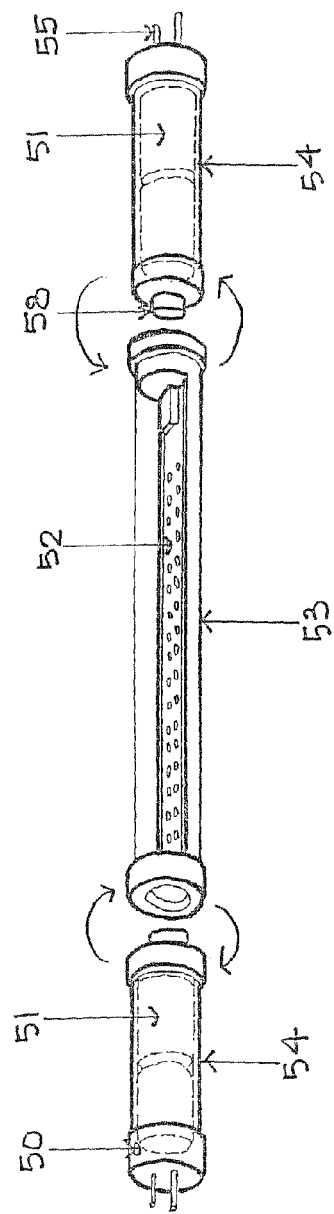
FIG. 8
FIG. 9

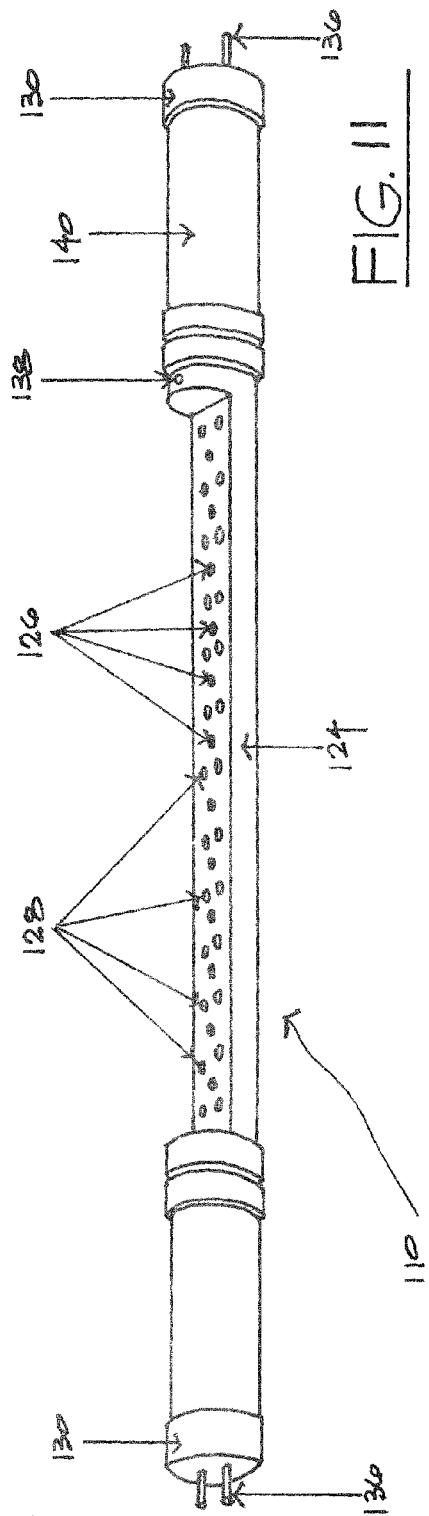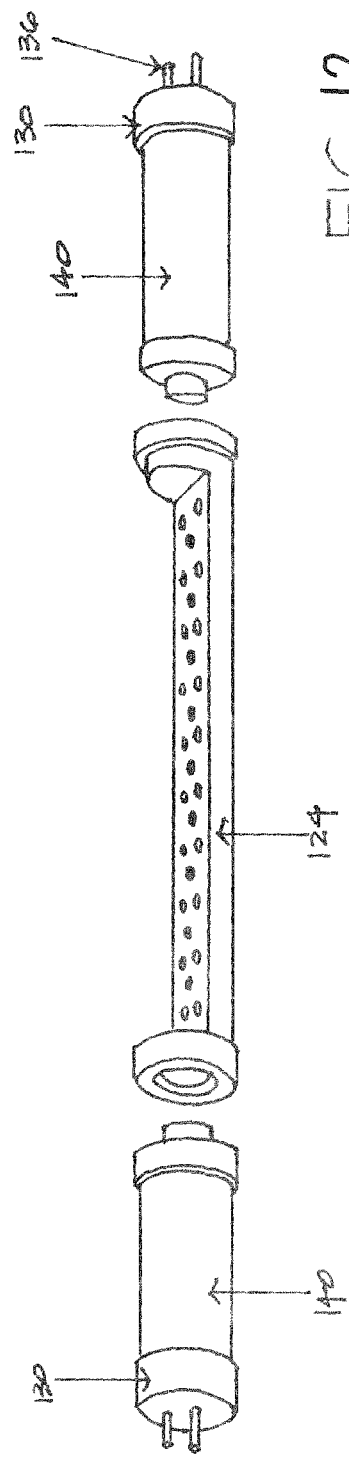

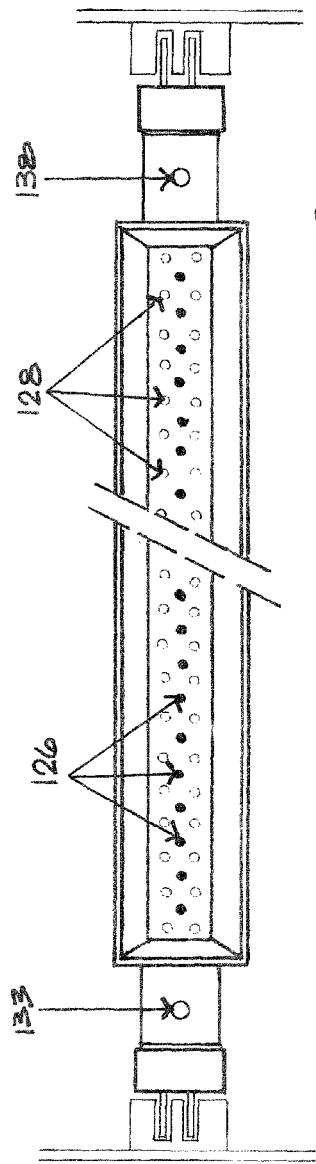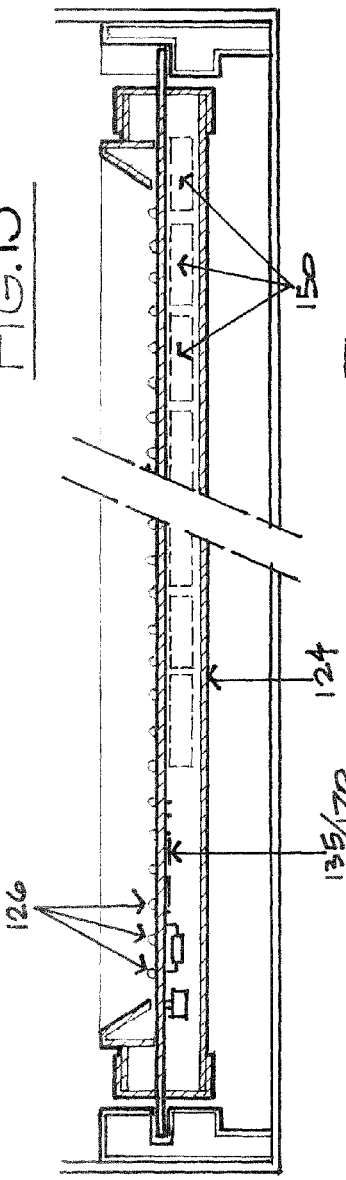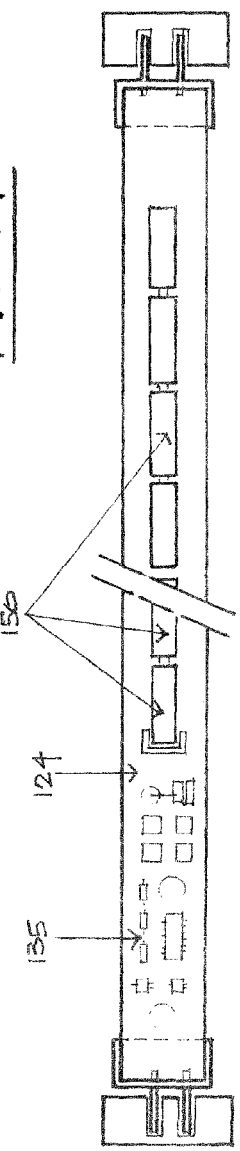

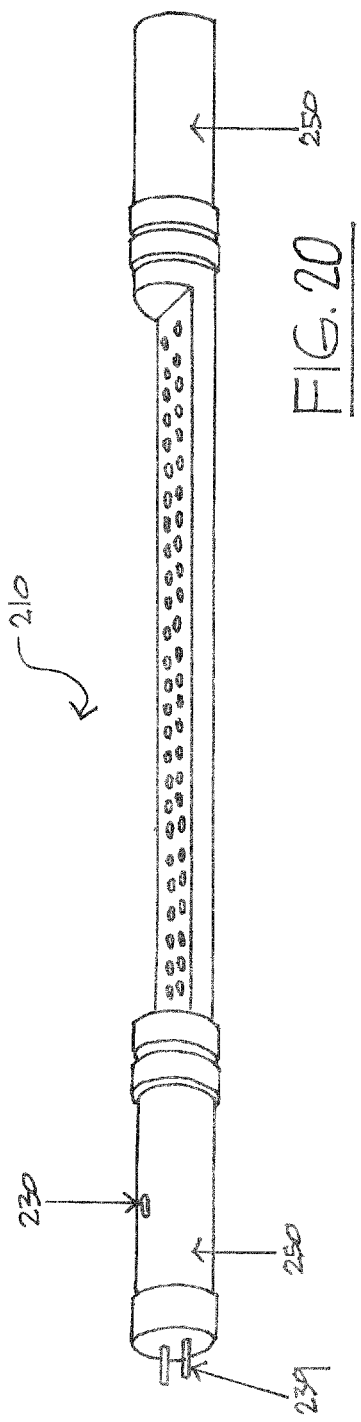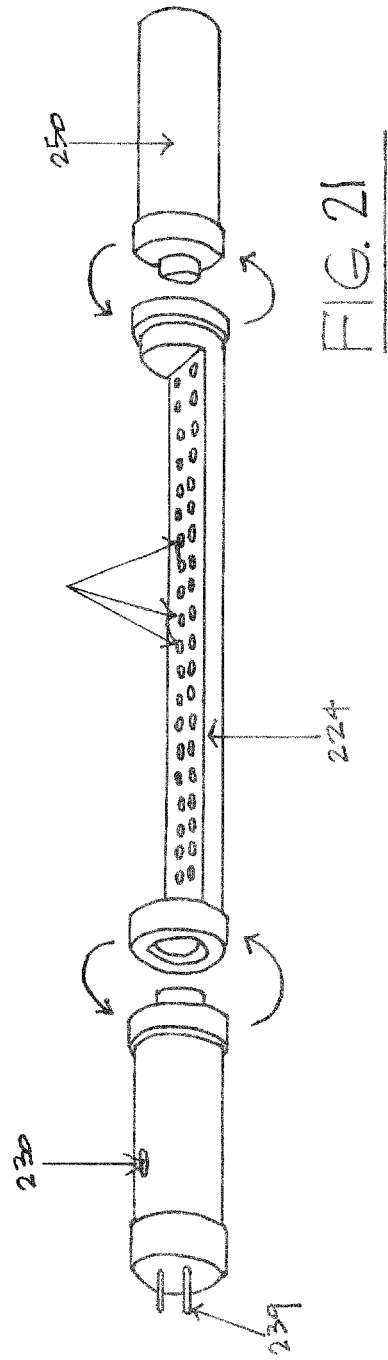

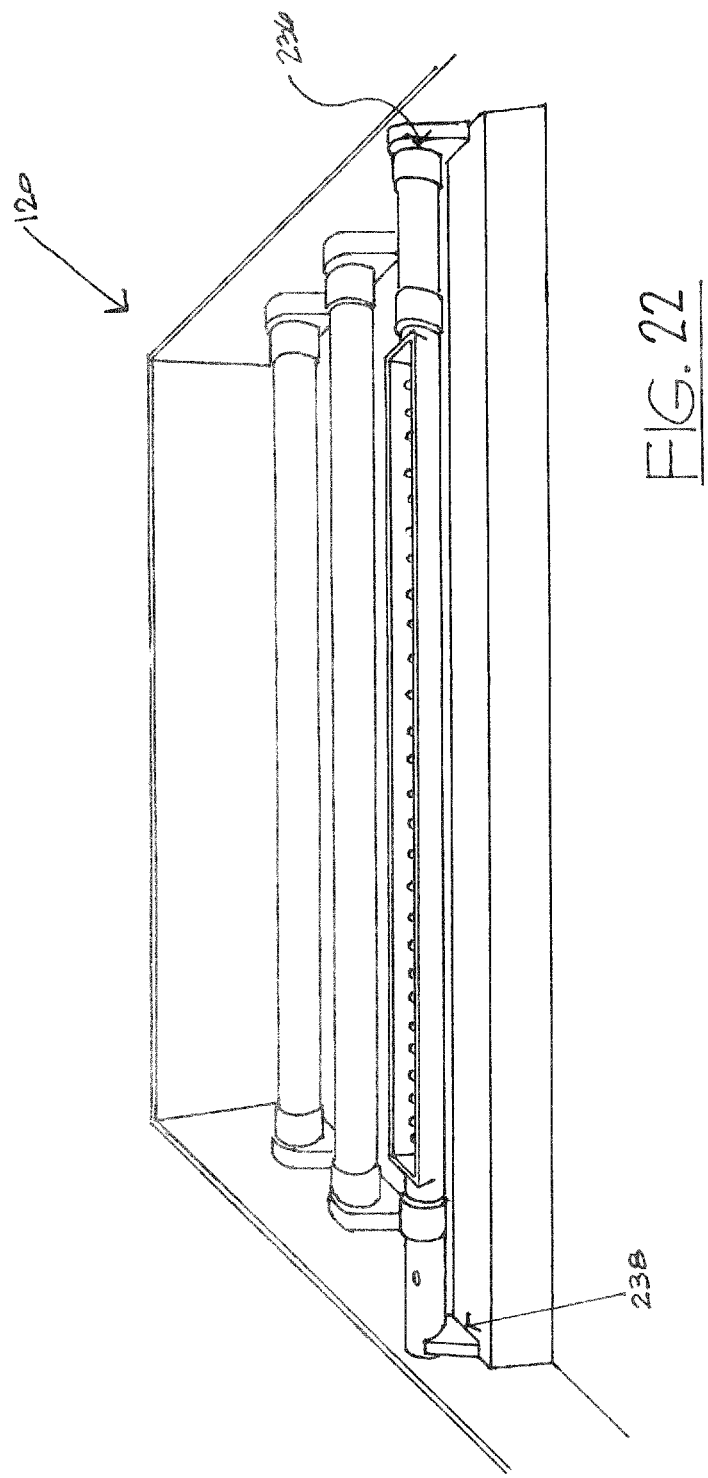

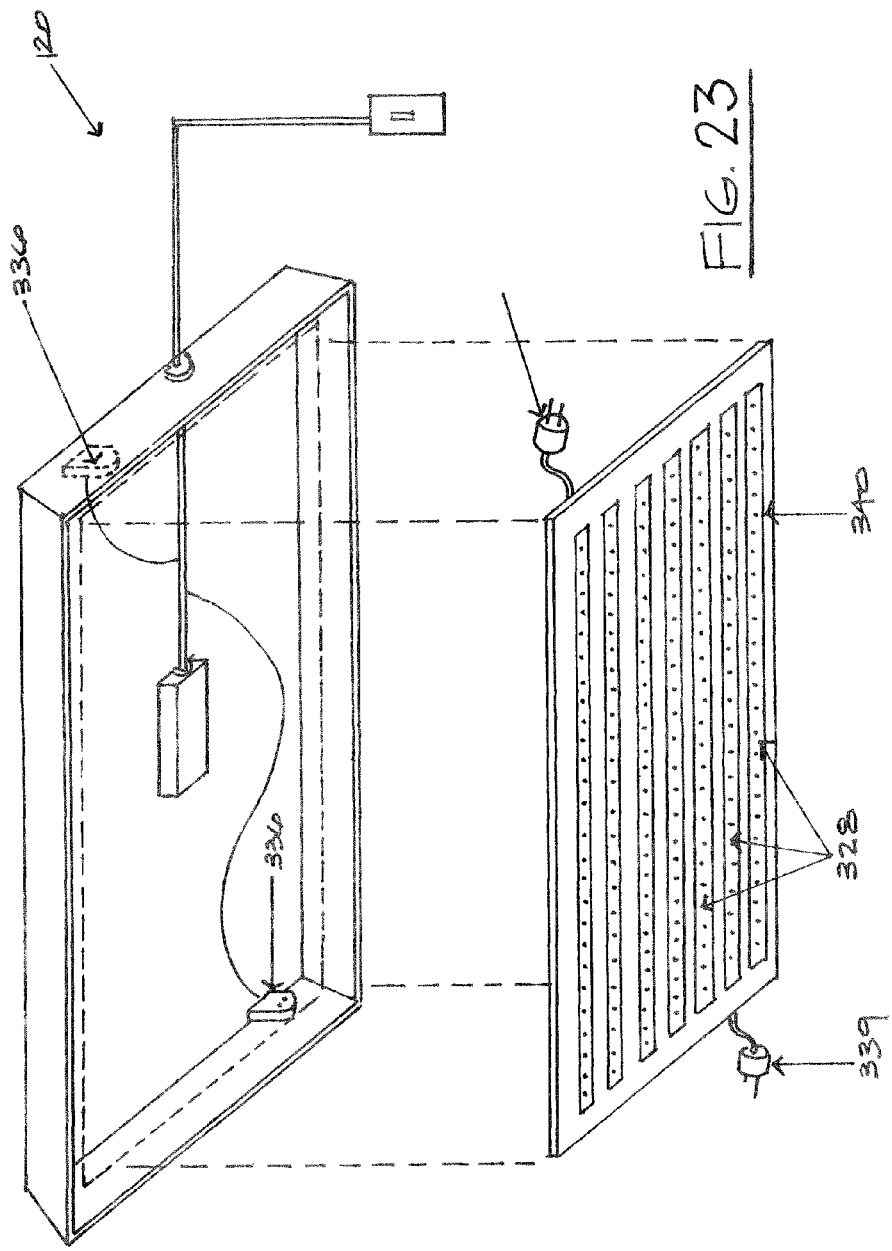

LIGHT ASSEMBLY

CROSS REFERENCE TO RELATED APPLICATIONS

This application claims the benefit of U.S. Provisional Application Ser. No. 61/450,825 having a filing date of Mar. 9, 2011. This application also claims the benefit of and is a continuation-in-part of co-owned and co-pending U.S. application Ser. No. 12/983,227 having a filing date of Dec. 31, 2010 (which claims the benefit of U.S. Provisional Application No. 61/335,132 filed on Dec. 31, 2009).

BACKGROUND OF THE INVENTION

The present invention relates to light assemblies that incorporate a night-light and/or an emergency light within an LED (light emitting diode) light assembly. Alternatively, the novel LED light assembly of the present invention may be designed into a single light source having a multi-functional light. During the day, the LED light assembly will function as the primary light source, operating all the LEDs within the light assembly. During the night, the LED light assembly will function as a night light, operating only a limited number of LEDs to avoid complete darkness within the space and during a power loss, operating the same number of LEDs to again avoid darkness. The inventor contemplates that these concerns may most efficiently be managed during the construction of a new home or new commercial building.

Presently, there are various conventional light fixtures that incorporate emergency lighting, and are powered by AC energy with battery backup. When the power is unexpectedly interrupted due to a storm or other event, the emergency lighting automatically illuminates. Cost is one issue related to most of these conventional emergency lighting systems as they are very expensive.

Yet another issue for a conventional stand-alone emergency lighting system that may contain incandescent, fluorescent or halogen lamp and may be powered by expensive, alkaline, sealed lead battery modules is the relatively short charge time. Many of these conventional systems are generally only designed to provide at a maximum between one to three hours of effective emergency lighting. Not only is this approach expensive, this presents a concern for emergency generated power outages that last longer than three hours.

Yet another issue is that current design trends favor the spatial and aesthetic benefits typically provided by fluorescent tubes, even though fluorescent tubes cost more to operate than LED assemblies.

Yet another concern is the cost of illuminating conventional lighting such as incandescent, fluorescent, or halogenated light sources.

Fixtures using fluorescent tubes or LED light assemblies as its source of lighting are common in homes, offices and retail stores. Fluorescent tubes may typically use 60-80% more energy than LED light tubes. Fluorescent lighting system are not practicable for such emergency lighting due to their high voltage and alternating current requirements making a battery backup difficult during power failure. It is therefore an ongoing effort to improve LED lighting sources to provide adequate lighting for longer periods while reducing the manufacturing and operating costs.

Typical LED light tube assemblies currently on the market operate only as a primary light source for the home and the work place. As a way to provide night lighting within a space, owners typically would leave on several light fixtures during the night. As energy costs continue to grow, owners are looking for other options to reduce energy cost. The present invention would mitigate the need of leaving several light fixtures on during the night, saving energy cost for the owner. The present invention may also provide additional operating time during a power failure, at the same time improving the light quality of the night-light at night. One concern with the use of LED tubular light bulbs is the heat retention within the lighting assemblies. Heat management is an ongoing challenge to ensure that the LED light assemblies enjoy a reasonable lifetime of use.

It would therefore be an improvement in the art to provide an LED lighting assembly that resolves the aforementioned concerns.

BRIEF DESCRIPTION OF THE DRAWINGS

FIG. 1 illustrates a perspective view of one embodiment of a light assembly in accordance with the present invention.

FIG. 2 illustrates a perspective view of one embodiment of a light assembly in accordance with the present invention.

FIG. 8 illustrates a perspective view of a second embodiment of a light assembly in accordance with the present invention.

FIG. 9 illustrates a perspective view of a second embodiment showing the connections between the lithium batteries and the light emitting diode(s) in accordance with the present invention.

FIG. 11 is an embodiment of the present invention incorporating a bulb-free and open housing.

FIG. 12 is another view of the embodiment of FIG. 11.

FIG. 13 is a top view of another embodiment similar to the embodiment of FIG. 11, with fewer LED lights.

FIG. 14 is a side view of the embodiment of FIG. 13, illustrating placement of the batteries.

FIG. 15 is a bottom view of the embodiment of FIG. 13.

FIG. 20 is a view of a light assembly similar to FIG. 11, but having only one end cap for electrical communication with an associated troffer or housing.

FIG. 21 is a view of the light assembly of FIG. 20 illustrating the removable battery compartments.

FIG. 22 illustrates the installation of the light assembly of FIG. 20 within a troffer or housing.

FIG. 23 illustrates a light unit and an LED panel wired in accordance with the present invention, for insertion within a troffer or housing.

SUMMARY OF THE INVENTION

Figure 3:
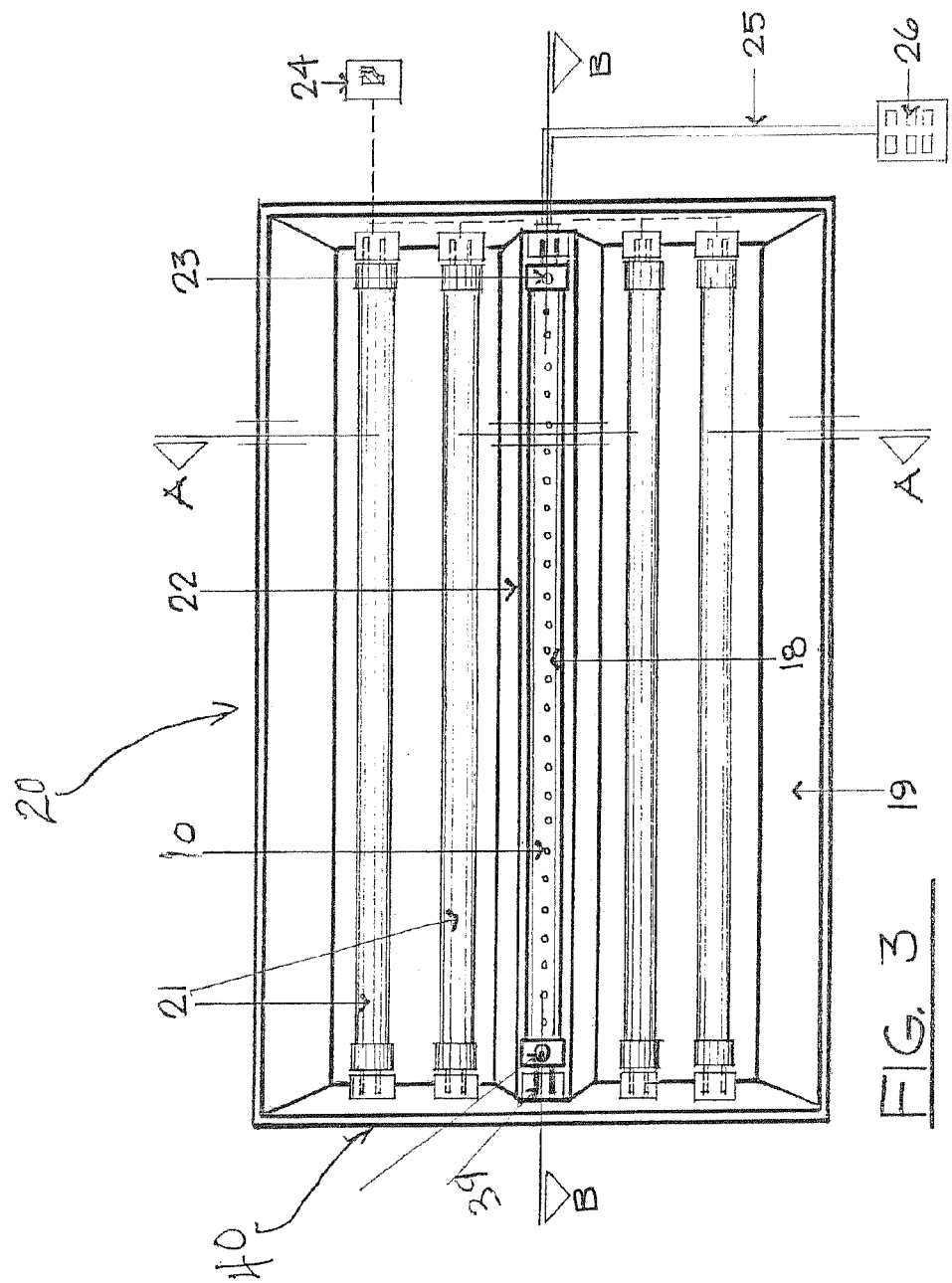
FIG. 3 illustrates a view of one embodiment of a light assembly within a conventional fluorescent troffer assembly, in accordance with the present invention.

The above-referenced concerns are resolved by providing a first exemplary embodiment of an LED lighting assembly containing: a housing; one or more solid state lighting units contained within the housing and actuated by alternating current power; a night light contained within the housing and operably communicating with the solid state lighting units, the night light actuated, by alternating current or direct current power for example, in the absence of light from the solid state lighting units; one or more light emitting diodes contained within the night light; and a battery source for powering the night light in the event of power interruption.

A second exemplary embodiment of an LED lighting assembly in accordance with the present invention includes a light assembly containing: a housing; one or more solid state lighting units contained within the housing and actuated by alternating current power; a night light contained within the housing and operably communicating with the solid state lighting units, the night light actuated by direct current power in the absence of light from the solid state lighting units; and a direct current power supply contained within the housing and operably communicating with the night light; one or more light emitting diodes contained within the night light and powered by the direct current power supply; a battery source for powering the night light in the event of power interruption; and a battery charger within the housing and actuated by alternating current or direct current power, the battery charger operably communicating with the battery source.

In yet another aspect of the invention, a lighting unit may contain: a housing or elongated tube; one or more light emitting diodes contained within the housing or elongated tube; and a battery source contained within the housing or elongated tube, the battery source configured to selectively power the light emitting diodes with direct current energy.

In yet another aspect of the present invention, a lighting unit may contain: a troffer or housing; a tubeless and/or bulb-free sub-housing contained in the troffer, in contrast to and as distinguished by the tubular bulbs typically used in fluorescent tube technology for example; a first array containing one or more light emitting diodes (LEDs) contained within the bulb-free sub-housing that function as a direct current- or DC-powered emergency/night light; a second array containing one or more light emitting diodes contained within the bulb-free housing that function as an alternating current or AC solid state lighting by converting the AC power to DC power for operation of the LEDs; a battery source contained within the bulbless sub-housing, the battery source configured to selectively power the first array of LEDs with DC power in the absence of AC power; and a photo-switch/sensor that selectively actuates the first array of LEDs and powers them with AC/DC power in normal operation of the lighting unit.

DETAILED DESCRIPTION OF THE PREFERRED EMBODIMENT(S)

FIG. 1 is an illustration of a perspective view of a first embodiment of an emergency or backup lighting assembly 10 employing one or more light emitting diodes (LEDs). A housing or elongated tube 11 contains all internal circuitry and lighting as described below and may be manufactured as known in the art. In general, the tube 11 may be substantially similar to the housing or tube typically employed for a fluorescent light bulb, for example.

As shown in FIG. 1, an array or subassembly 12 of one or more light emitting diodes is contained within the housing 11 and may be substantially coextensive with the housing 11. The array 12 may be formed as known in the art. At least one power supply connector 13 is provided at a first end 13a for charging the batteries as explained below. In the embodiment shown in FIG. 1, a first and a second connector 13 are provided at a first end 13a and a second end 13b, respectively. A photocell switch 14 operably communicates with the LED circuitry to provide direct current (DC) or power thereto, and actuates and deactivates the LED circuitry when light is absent or present, respectively.

As shown in FIG. 2, a panel 15 is removably fixed to housing 11 and covers an inner cavity or recess 15b. One or more batteries 16, preferably lithium rechargeable batteries, may be stored within recess 15b and provide DC power to the LED array 12 upon switching of photocell switch 14. A test circuit 18 may be provided on the outer housing 11 to provide convenient testing of the emergency lighting circuitry.

In one embodiment shown in FIG. 3, a conventional fluorescent light assembly 19 is provided in accordance with the present invention. A troffer or housing 20 contains one or more fluorescent tubes 21, all AC (alternating current) powered in a conventional manner. Other solid state lighting assemblies/units 21 are contemplated in accordance with the present invention, and may include other solid state lighting units such as incandescent, LED, mercury-based, and other types of solid state lighting units. As also indicated or alluded to in FIG. 3, a ballast (not shown) may also be provided to control the electric current applied to the fluorescent tubes 21. A ballast cover 22 may be provided down the center of the solid state lighting unit 21 thereby hiding the ballast area from view. FIG. 3 also illustrates an elongated LED night light assembly 10, retained outside of the ballast cover 22. One or more sockets 39 receive one or more corresponding connectors 13 at ends 13a and 13b of light assembly 10, thereby providing alternating current power to the night light assembly 10 to at least one of the connectors 13. Alternating current may be directly provided by a continuous circuit from service/power box 26 to socket(s) 39 vis a vis line 25, for example. The fluorescent bulb(s) 21 function as the primary light, and are operated by a remote switch 24. A photocell switch 23 operatively communicates with light assembly 10 to activate and deactivate the light assembly 10 by turning the bulb(s) 21 off and on, respectively. Accordingly, as the bulbs 21 are turned off at the end of the day, the photocell 23 will recognize the waning light and activate the light assembly 10. On the other hand, when the lights 21 are turned on, the photocell 24 will recognize the increasing light and deactivate the light assembly 10.

Figure 6:
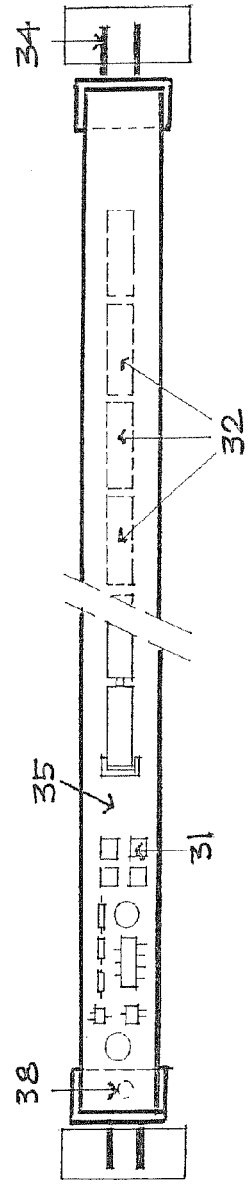
FIG. 6 illustrates a view of a circuit board of one embodiment of a light assembly in accordance with the present invention.
Figure 7:
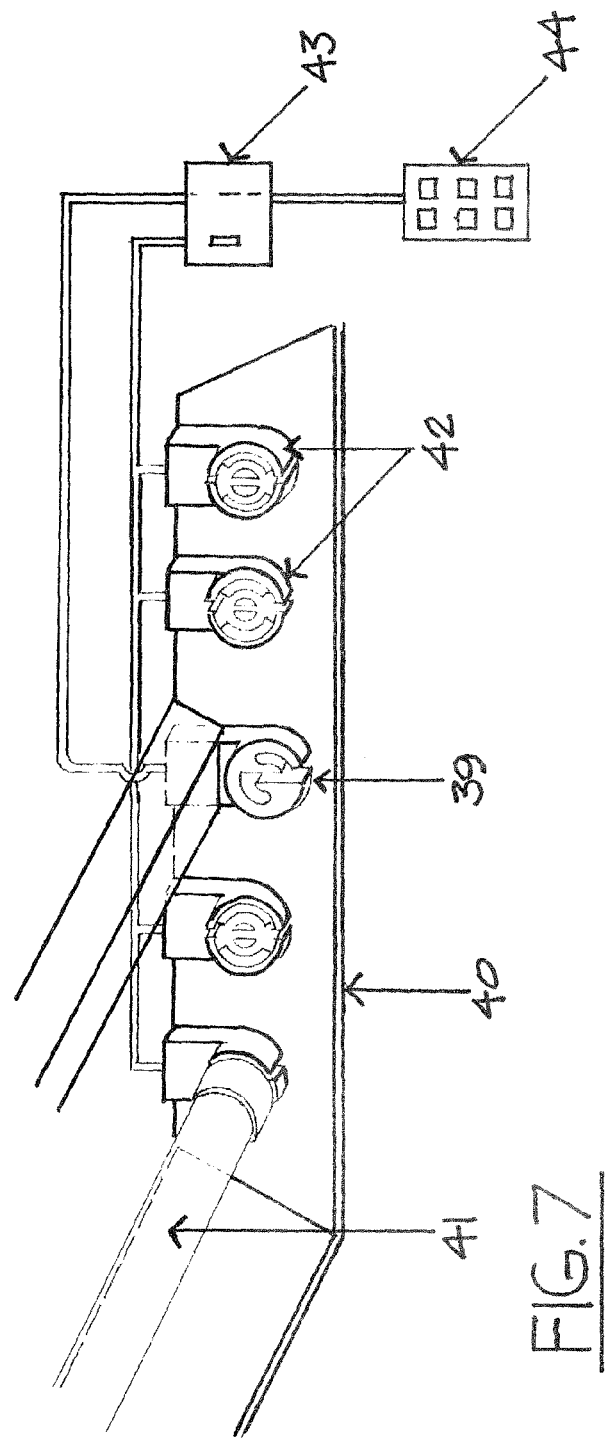
FIG. 7 illustrates a perspective view of an end portion of a fluorescent troffer in accordance with the present invention.
Figure 10:
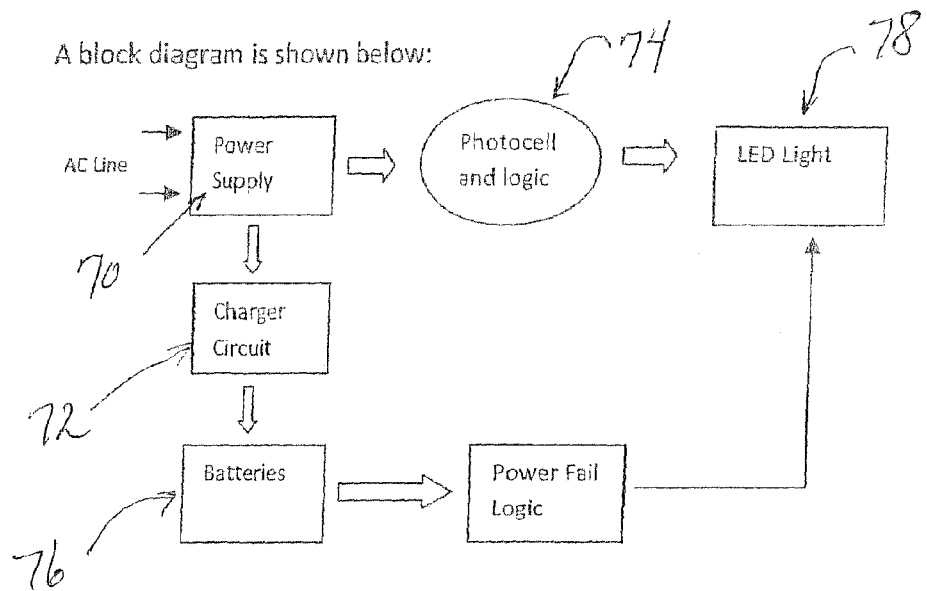
FIG. 10 is a schematic of the operation of a lighting unit in accordance with the present invention.

FIG. 7 exemplifies one end 40 of the troffer or housing 20 of FIG. 3. Sockets 42 are configured to receive conventional solid state lighting units such as fluorescent or LED tubes, while socket 39 is configured to receive a night or emergency light unit 10 in accordance with the present invention. A three-wire system is illustrated in FIG. 7 and eliminates the need for a toggle switch or other switch as the actuation and de-actuation means for the fluorescent or other solid state lighting source and the second light source (night light). Referring to FIGS. 3, 7, and 10, the LED array 78 powered by sockets 39 is activated by electronic communication with a standard AC power supply 44 (e.g. 110 VAC). As photocell 43 detects a darkened condition, alternating current in normal circumstances is then only applied to socket 39, and not to sockets 42. As shown in FIGS. 3-6, for example, the periphery of the housings 30 is generally depicted as being circumferential. It will be appreciated that the peripheral geometry of the housing 30 may be formed to accommodate the spatial requirements of the circuitry 35, and may therefore for example only, take on a "half-rectangular" cross-section to fit in the requisite components. Nevertheless, the circumferential geometry of the housing 30 is preferably maintained at least around the ends 13a and 13b to facilitate a ready receipt of the connectors 34 within the female sockets.

Various other optional features such as dimmer switches or multi-colored LEDs may be provided.

Figure 4:
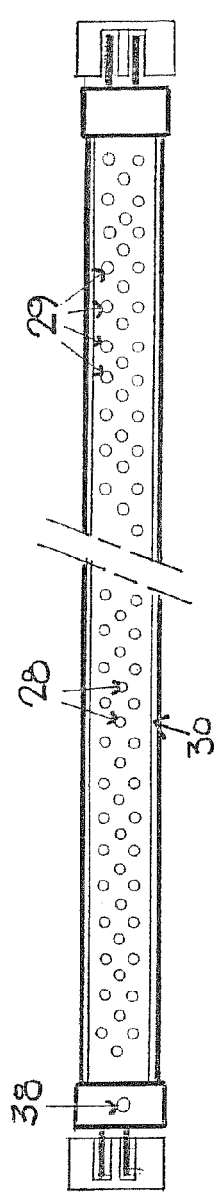
FIG. 4 illustrates a top view of one embodiment of a light assembly in accordance with the present invention.
Figure 5:
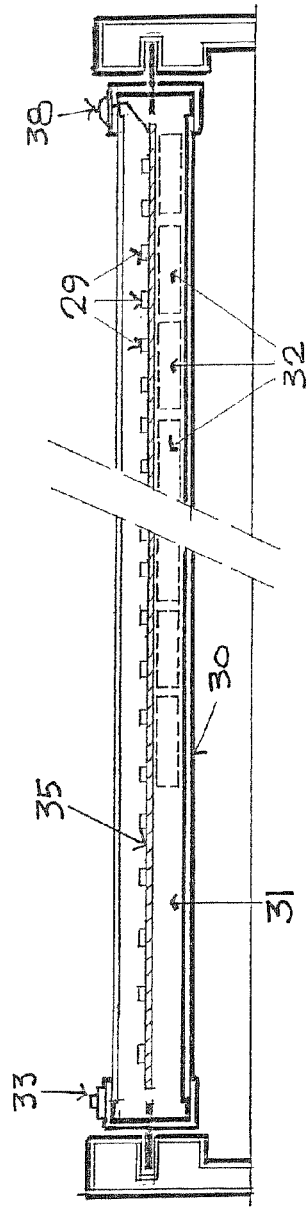
FIG. 5 illustrates a cross-section view of one embodiment of a light assembly in accordance with the present invention.

As shown in yet another embodiment in FIGS. 4, 5, and 6, a circuit board 35 is contained within night light housing 30 and provides circuitry to convert an incoming 110 VAC to 12-15 VDC. A photocell 38 is provided at one end of the housing 30, and as explained below relative to FIG. 10, operably communicates with the LED array 29 to provide DC power in the absence of light from the primary light source (not shown in these figures). Batteries 32 are contained within housing 30 and operably communicate with circuitry 31 and 35 (as explained relative to FIG. 10) in the event of a power interruption. A test control 33 is coupled to the LED array 29 and is useful for service tests to comply with regulatory requirements on periodic testing of emergency service equipment.

An AC/DC power supply/converter 70 is schematically shown in FIG. 10 and is provided to supply direct current power to the plurality of light emitting diodes or LED array 29. Converter 70 may, but not by way of limitation, be provided by V-Infinity of Oregon as identified as part number FSC-S15-15U, for example. It will be appreciated that other sources of alternating current may also be rectified or converted to appropriate amounts of direct current depending on design criteria. For example, 220 VAC could also be rectified to 15 VDC if desired.

As also schematically shown in FIG. 10, converter 70 therefore operably and electronically communicates with battery source charger 72 and to a photocell 74, thereby providing direct current power to each. Alternatively, a rectifier may instead be provided rather than the converter 70, so long as direct current power ultimately is provided in appropriate and operable amounts to the charger 72 and the LED array 78. Charger 72 electronically or operably communicates with one or more batteries 76 to maintain a charge to the rechargeable batteries 76. In the event of power failure, direct current by and through photocell 76 is interrupted due to the absence of alternating current being supplied to direct current power supply 70. Accordingly, in the event of power failure, direct current is provided from the batteries 76 to LED array 78. Batteries 76 may be formed from nickel-metal hydrides, or from lithium ion technology.

The batteries 76 may be provided from Sanyo Corporation of Japan, for example. The battery charger 72 may be, for example only and not by way of limitation, be provided from various designs available from Texas Instruments, part number bq24702, for example. The charger 72 may provide a "fast" charge for batteries depleted from a prolonged use. Or, the charger 72 may provide a "trickle" or "top off" charge to maintain the charge at a substantial maximum without overcharging. Accordingly, the charger 72 may also be designed to contain a "detector" mode whereby the charger 72 can identify whether a "fast charge" or "trickle charge" is necessary based on battery charge measurements. The LED array 78 may be provided from companies such as Stand Electronic Co., Limited located in Guangdong, China.

As also schematically exemplified in FIG. 10, the photocell 74 may for example, but not by way of limitation, be provided from Advanced Photonix, Inc. as part number PDV-P8101, and is operable based on a darkened condition, either from deactivation of the primary lighting assembly and bulbs 21, or, by the onset of a power outage with resultant darkness. LED light array 29 or 78 is thereby activated based on an absence of light from the primary light assembly and bulbs 21.

In yet another embodiment shown in FIGS. 8 and 9, batteries 51 may be provided at opposite ends of the light unit 53 thereby providing emergency or night lighting to the LED array 52. Contacts 55 may be seated within female receptacles within a light assembly such as shown in FIG. 3. As shown in FIG. 9, the batteries 51 may be placed within storage compartments 54. The compartments 54 may then be rotatably fixed in electronic contact with each end of the LED array 53, thereby providing a direct current power supply in the event of an absence of power from the alternating current supply. Although not shown, it will be appreciated that equivalent circuitry as described by FIG. 10 and as shown in FIGS. 5 and 6 as circuit board 35 are provided in light unit 53 thereby converting or rectifying alternating current to direct current in the same way as described relative to FIG. 10.

Further, the battery source may contain consumable rather than rechargeable batteries. As a result, the charger 72 would not be necessary. The "consumable" battery source would then be actuated based on a default switch from the photocell 74 for example, indicating that direct current supplied from the power supply 70 had been interrupted, whereby the LED array 78 is actuated based on normal or consumable battery power.

In yet another aspect of the invention illustrated in FIGS. 11-27, and as particularly shown in FIG. 23, a housing or troffer 120 may be employed to contain one or more tubeless and bulb-free lighting units 122. As shown in FIG. 11, a sub-housing 124 is formed as a tubeless and bulb-free sub-housing, in contrast to and as distinguished by the tubular bulbs typically used in fluorescent tube technology, for example. The terms "bulb-free" or "bulbless" as used herein is meant to convey that the sub-housing 124 is not encased with glass or otherwise formed as a bulb or a portion of a bulb. The terms "bulb-free" or "bulbless" is not meant to convey that no bulbs are used within the sub-housing 124, light emitting diodes for example, but that the elongated housing is itself not a bulb or a bulb portion. It may therefore also be referred to as a "tubeless" housing because of the lack of a tubular cross-section given the absence of the glass bulb for example. As shown in FIG. 11, the sub-housing 124 may be elongated and co-extensive with the length of a conventional fluorescent tube for example, but does not share the geometric design of the fluorescent tube/bulb. It will be appreciated that other embodiments as disclosed in FIGS. 1-9, for example, may be presented in tubular housings or bulbs. Nevertheless, because of a heat management advantage, the embodiments exemplified in FIGS. 11-26 contain one or more open bulb-free sub-housings, thereby permitting the steady-state release of heat from the sub-housing, and thereby prolonging the life of the LEDs contained within the sub-housing 124.

Referring to FIGS. 11 and 12, one embodiment of a tubeless and/or bulbless sub-housing 124 is illustrated. A first array of one or more light emitting diodes (LEDs) 126 may be contained within sub-housing 124 and is selectively operated upon receipt of a signal occurring in the absence of ambient light, thereby operating as an emergency/night light. A second array of one or more light emitting diodes 128 may be contained within sub-housing 124 and is operated upon receipt of a DC signal converted from an AC power supply as a solid state lighting source. One of the two end caps 130 are positioned at one of the two ends 132 or 134 of the light unit 110. Prongs 136 are integral to each end cap 130 and facilitate electrical communication with a mating female socket within a light housing 120 (as shown in FIG. 23, for example). The elongated nature of the sub-housing 124, in one embodiment perhaps coextensive with a conventional fluorescent tube, makes the present light unit 110 a suitable and fit replacement insert for a conventional fluorescent tube assembly within a conventional troffer. Battery compartments 140 may be positioned on one or more ends of the light unit 110 for placement of a battery source therein. Although this embodiment and others may be characterized as utilizing DC energy to power the one or more LEDs in the LED array, for example, it will be appreciated that the LEDs may also be powered by AC energy in a known manner, such as when applied when utilizing "organic" LEDs, for example.

Figure 27:
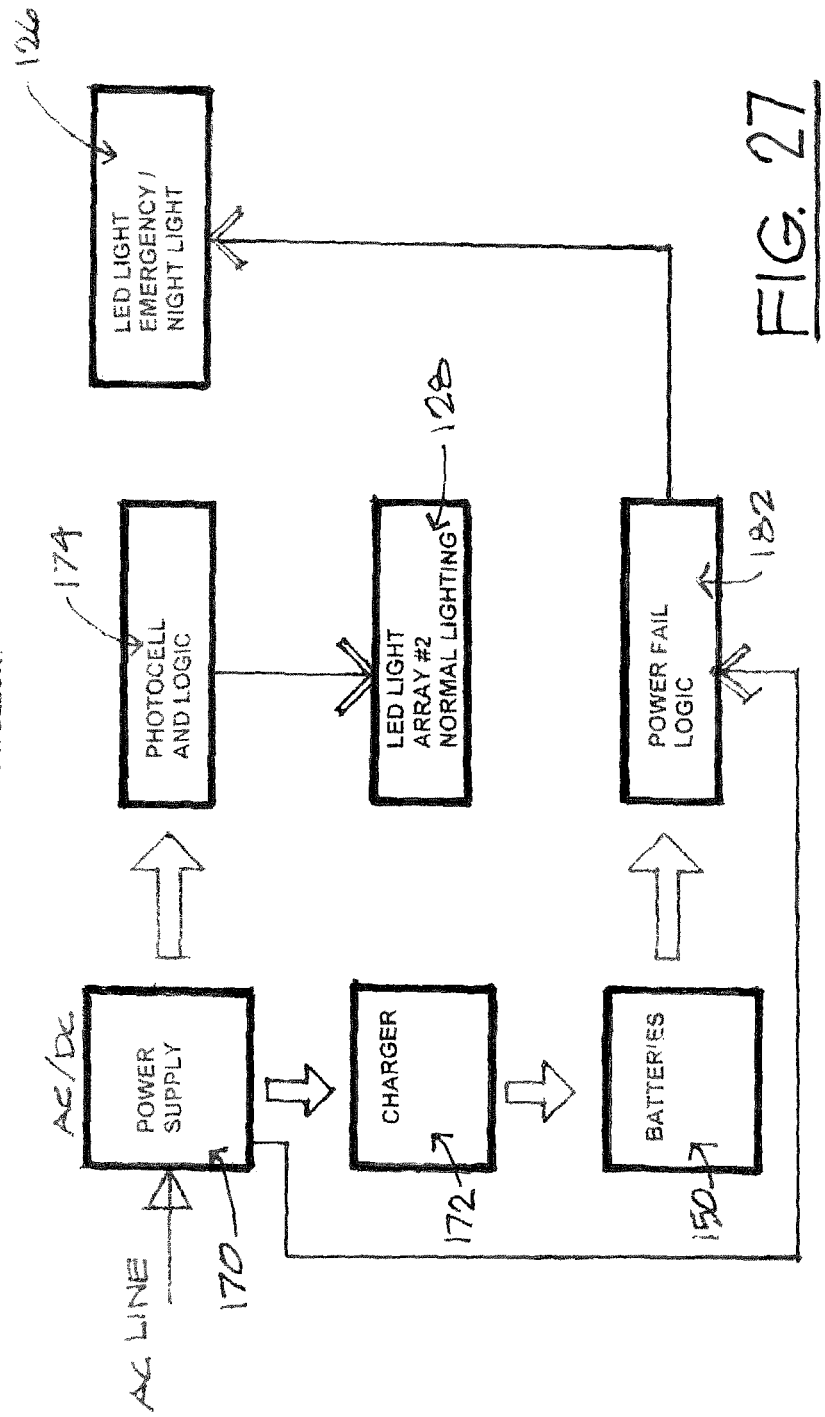
FIG. 27 illustrates a schematic of the circuitry of the embodiments of FIGS. 11-26.

As shown in yet another embodiment in FIGS. 13, 14, and 15, a circuit board 135 is contained within sub-housing 124 and provides circuitry (a rectifier for example) to convert an incoming 110 VAC to 12-15 VDC. A photocell 138 may be provided within the sub-housing 124, and as explained below relative to FIG. 27, operably communicates with the first LED array 126 to provide DC power in the absence of ambient light, and if desired, from the absence of the primary light source provided by LED array 128. As shown in FIG. 27, an AC power sensor 140 may be connected to an output of the AC/DC power supply and to an output of the battery source 150. In the event of a loss of AC power, the AC power sensor 140 senses the loss of energy and switches the light unit 110 to DC power from the batteries. The DC power from the batteries is thereby routed to the photocell 138 and therefore provides power to the first LED array 126 in the absence of ambient light, during an emergency situation for example.

A test control 133 may be coupled to the first LED array 126 and is useful for service tests to comply with regulatory requirements on periodic testing of emergency service equipment. As shown in FIGS. 14 and 15, batteries 150 may be housed within sub-housing 124 in a linear fashion, and adjacent LED arrays 126 and 128.

An AC/DC power supply/converter 170 is schematically shown in FIG. 27 and is provided to supply direct current power to the first LED array 126. Converter 170 may, but not by way of limitation, be provided by V-Infinity of Oregon as identified as part number FSC-S15-15U, for example. It will be appreciated that other sources of alternating current may also be rectified or converted to appropriate amounts of direct current depending on design criteria. For example, 220 VAC could also be rectified to 15 VDC if desired.

As also schematically shown in FIG. 27, converter 170 may operably and electronically communicate with battery source charger 172 and to a photocell 174, thereby providing direct current power to each. Alternatively, a rectifier may instead be provided rather than the converter 170, so long as direct current power ultimately is provided in appropriate and operable amounts to the charger 172 and the LED arrays 126 and 128. Charger 1.72 may electronically or operably communicate with one or more batteries 150 to maintain a charge to the rechargeable batteries 150. In the event of power failure, direct current by and through photocell 174 is interrupted due to the absence of alternating current being supplied to direct current power supply 170. Accordingly, in the event of power failure, direct current is provided from the batteries 150 to first LED array 126. As shown in FIG. 27, a power sensor 182 normally communicates with a signal from the power supply 170, thereby confirming the existence of AC power. In the event of an interruption in the power supply 170, the power sensor 182 switches to battery power from the battery source 150, thereby providing DC power in an emergency situation. The battery current is directed to the photocell 174 and provides power to first LED array 126 thereby providing emergency lighting in the absence of ambient light. As with the embodiments of FIGS. 1-10, the batteries may be disposable thereby obviating the need for a battery charger within the circuitry.

Referring to FIGS. 11 through 15, batteries 150 may also be provided at opposite ends of the light unit 110 thereby providing emergency lighting to the LED array 126 in the event of a power outage. Contacts 155 may be seated within female receptacles within a light assembly such as shown in FIG. 23. As shown in FIG. 12, the batteries 150 may be placed within storage compartments 154. The compartments 154 may then be rotatably or otherwise fixed in electronic contact with each end of the LED array 126, thereby providing a direct current power supply in the event of an absence of power from the alternating current supply. Although not shown, it will be appreciated that equivalent circuitry as described by FIG. 10 and as shown in FIGS. 5 and 6 as circuit board 35 are provided in light unit 110 thereby converting or rectifying alternating current to direct current in the same way as described relative to FIG. 10.

Referring to FIGS. 16, 18, 20, and 21 for example, a sub-housing 124 or 224 may be shaped as a bulb-free and partial tube, so that the LED array 128, operable during normal operating conditions, is exposed to the ambient and open environment of the housing or troffer 120, thereby presenting a heat management advantage. Oftentimes, when bulbs are used as shown in FIGS. 1, 2, 8, and 9, for example only, a buildup of heat during operating times must be effectively managed through the use of heat sinks for example, to ensure longevity and workability of the subassembly. Again, as with FIG. 11, the terms "bulb-free" or "bulbless" is defined as indicating that the sub-housing 124 does not contain a glass tube or glass bulb extending along a substantial portion or all of the length of the sub housing 124; see the light assemblies containing a bulb extending along a substantial portion or all of the length of the sub-housing 124 as shown in FIGS. 1, 2, 8, and 9, for example. Accordingly, the sub-housing may be "bulb-free" or "bulbless" with respect to the housing and still contain LED lights for example. Again referring to FIGS. 16, 18, 20, and 21, for example, the sub-housing may also be characterized as "tubeless". The term "tubeless" is defined as indicating that the sub-housing is shaped other than as a tube, wherein the LED replacement tubes known in the art also contain a glass tubular portion for example, as referred to above. Accordingly, the LED replacement light assembly shown in FIGS. 11, 12, 13, and 16-22, for example may be characterized as a lighting unit containing a tubeless and/or bulbless housing; and one or more light emitting diodes contained within said housing, the lighting unit communicating with a power source in electrical communication with said one or more light emitting diodes. The power source may for example, be alternating current as known in the art. Or, the power source may be direct current provided from a battery source or rectifier for example. Or, the power source may be a blend of alternating current during normal operation, and direct current during night-time or emergency operation of the light assembly, as also discussed in the present specification. See FIGS. 10 and 27, for example. Accordingly, it should be appreciated that a bulbless and/or tubeless light assembly in accordance with this aspect of the invention may simply be built as known in the art, absent the glass tube that is typically part of the construction of known replacement LED light assemblies, or replacement LED tubes.

Figure 16:
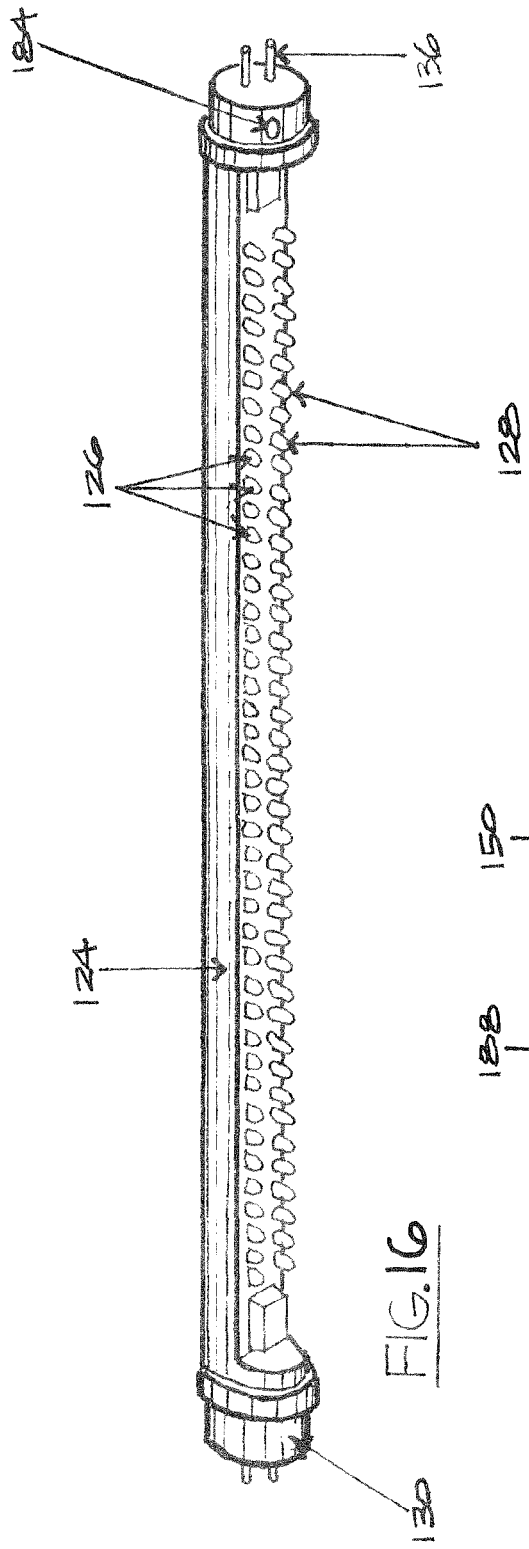
FIG. 16 is a perspective view of yet another embodiment illustrating an open and bulb-free sub-housing, the embodiment functioning as a replacement to typical fluorescent tubes.

Various embodiments of the present invention, such as the embodiment shown in FIG. 16, may contain end caps and prongs as shown in FIGS. 11 and 12, thereby providing a ready replacement for conventional fluorescent tubes for example. The LED array 128 may communicate with an AC/DC power supply 170 (not shown), and may operate with or without the additional night light first LED array 126. The circuitry may contain a rectifier 170 for converting AC power to DC power and omit any batteries for emergency use. Additionally, if desired, an LED array 126 may still be used to supply night lighting and as described relative to FIGS. 11 and 12, whereby the array 126 is illuminated as photo-sensor 184 is actuated upon the absence of light. As stated above, the LED array 126 is selectively illuminated by the photo-sensor 184 in lieu of the LED array 128, which operates during normal operating conditions during the day. In this embodiment, the circuitry may be provided as known in the art. U.S. Pat. No. 7,049,761, herein incorporated by reference in its entirety, exemplifies certain circuitry that may be useful in the present invention.

Figure 17:
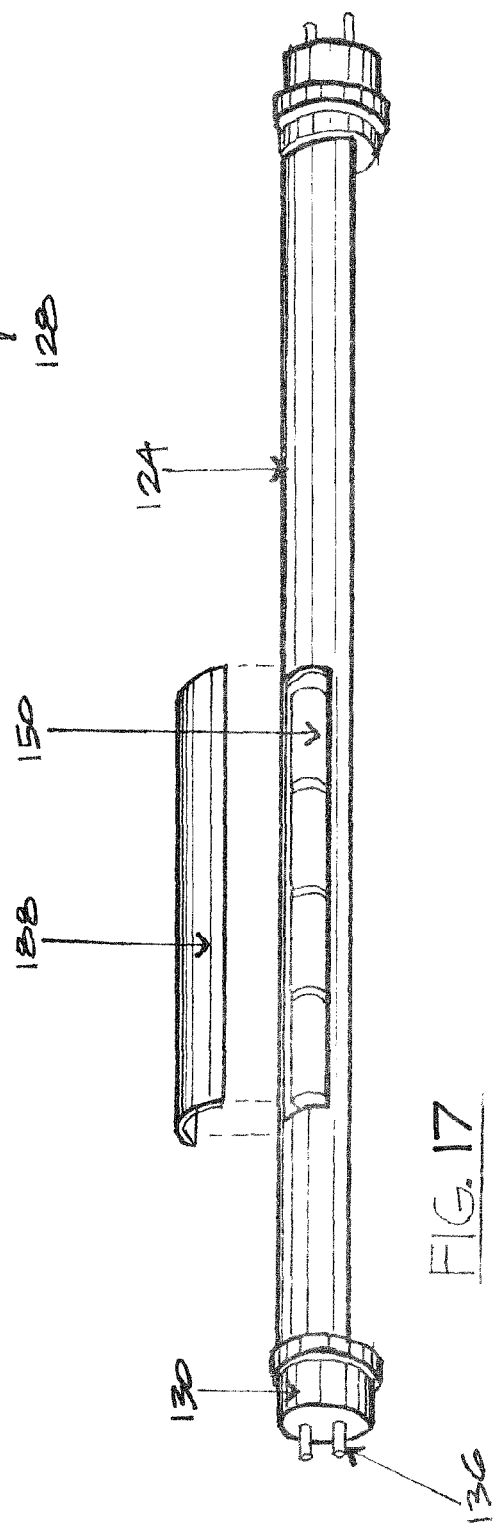
FIG. 17 is a bottom view of the embodiment of FIG. 13, illustrating the access panel to service the battery source.

Referring to FIG. 17, the backside of the embodiment illustrated in FIGS. 13-15 is shown whereby a door panel 188 provides an access to replace batteries 150 as needed.

Figure 18:
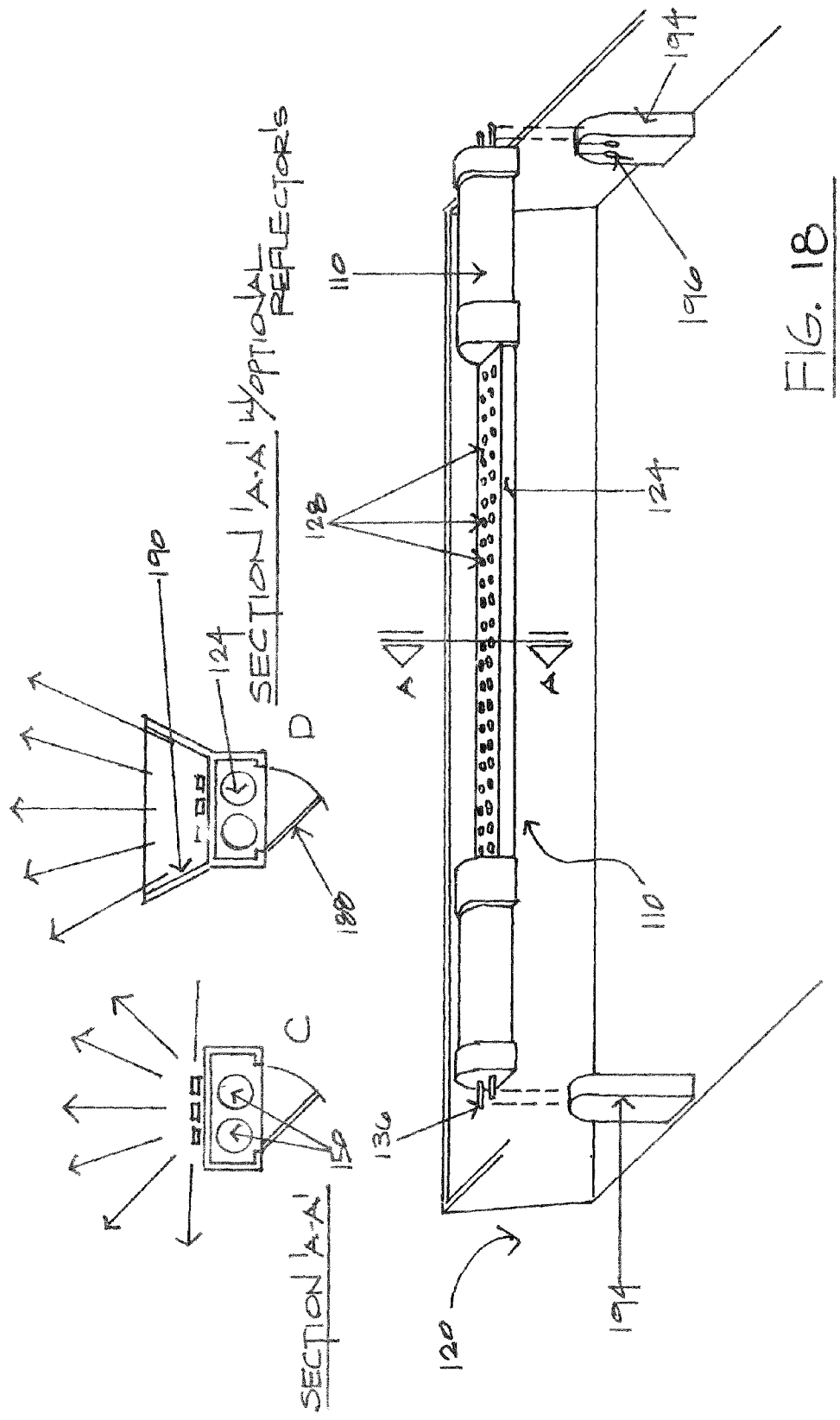
FIG. 18 is a view of yet another embodiment similar to the embodiment of FIG. 11, wherein reflective portions are illustrated that direct the radiation of the light.
Figure 19:
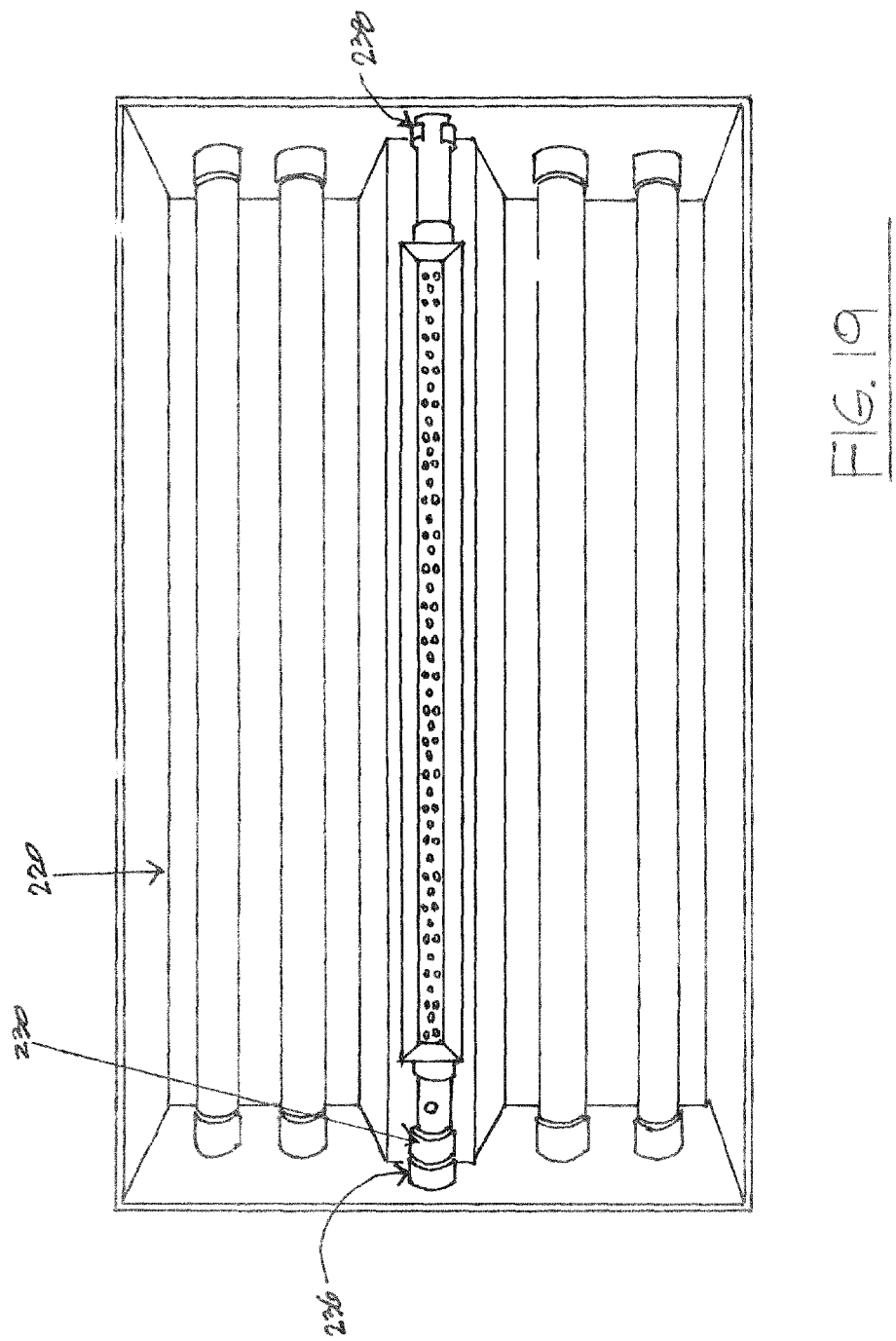
FIG. 19 is a view of a conventional troffer or housing containing both fluorescent and a light assembly in accordance with the present invention.

Yet another embodiment of FIG. 18 illustrates how a lighting unit 110 of FIGS. 1 and 2 can be inserted within a troffer or housing 120. Cross-sections are also shown taken along the line A'-A'. In a first cross-section C, the illumination of the LEDs is unconstrained and radiates in an arc approximating 180 degrees. In a second cross-section D, optional adjustable reflectors 190 are fixed or positioned on the sub-housing 124 to form a desired angular relationship from the sides 192 of the sub-housing 124 of the cross-section D, thereby directing more lighting to areas below the lighting unit 110. As shown in FIG. 18, in one embodiment, the sub-housing 124 is slidably engaged within female mounts 194 as prongs 136 interface and electrically communicate with electrical contacts 196 within the mounts 194.

In contrast to FIGS. 16 and 17 that illustrate a two-endcap embodiment, for example, yet another embodiment of FIGS. 19-22 illustrates a one-endcap embodiment of the present invention. An end cap 230 is fixed at one end of the sub-housing 224. A set of prongs 239 is fixed within the end cap 230 and electrically communicates with a female socket 236 for receipt of AC energy within the lighting unit 210. As shown in the drawings, the embodiment is substantially similar to the embodiments of FIGS. 1 and 2 with the exception that the batteries 250 on each end of the sub-housing 224 are powered or charged by electrical communication from only one endcap 230. The electrical circuit loops through the LED arrays 226 and 228 to provide the same functional relationship, night light/emergency lighting and conventional lighting, respectively, as in the embodiment of FIGS. 11 and 12. U.S. Pat. No. 6,936,968, herein incorporated by reference in its entirety, exemplifies but does not limit the various circuitries that could be employed to accommodate the one-endcap system. As shown in the FIGURES, the sub-housing is supported by the socket 236 and a mounting bracket 238 at an opposite end of the sub-housing having no end cap 230, for support of the end having no end cap.

Figure 24:
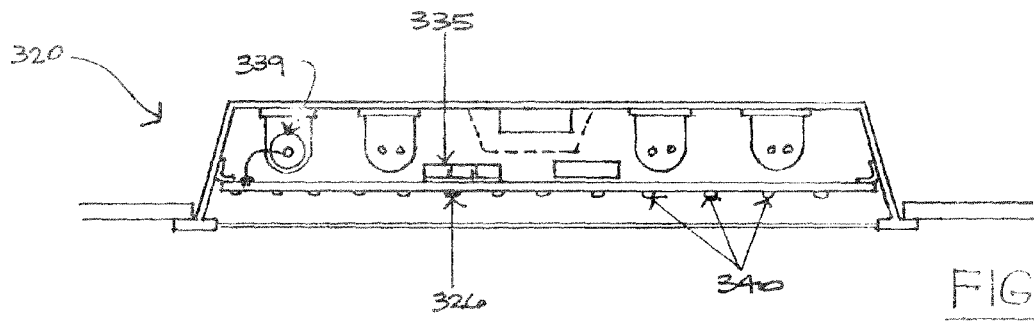
FIG. 24 illustrates a side view of the light unit of FIG. 23.
Figure 25:
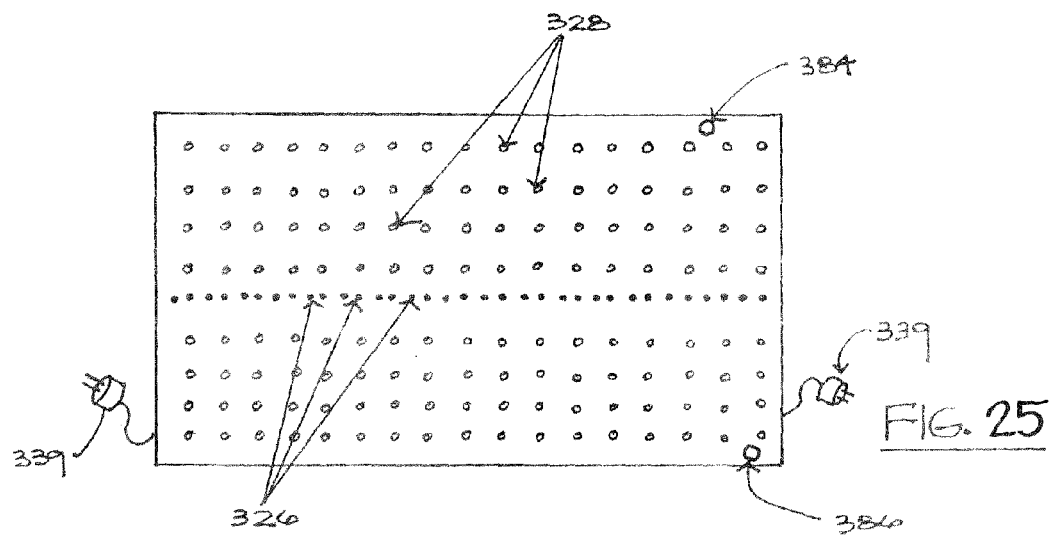
FIG. 25 illustrates a top view of the panel of FIG. 23.
Figure 26:
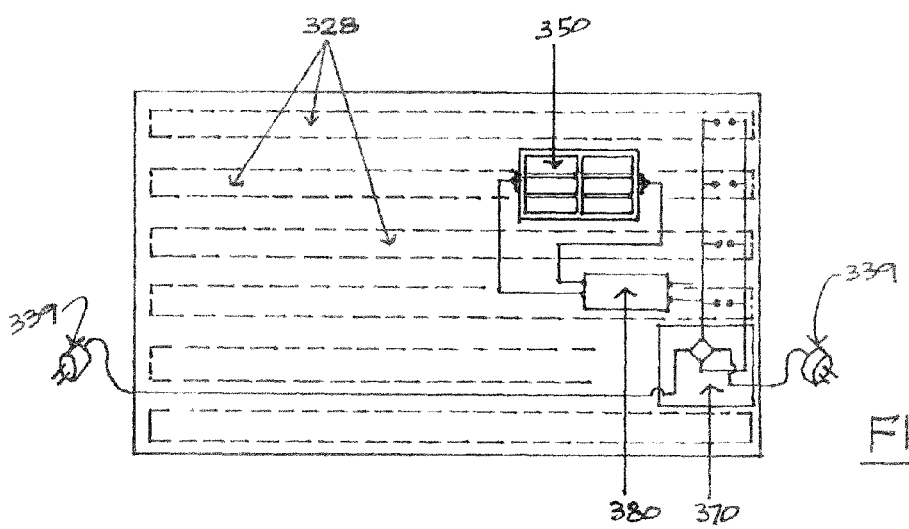
FIG. 26 illustrates a bottom view of the schematic wiring of the panel of FIG. 23.

FIGS. 23-26 illustrate an embodiment that provides a modular concept of the present invention. As shown in FIG. 23, a plurality of LED arrays/strips 328 are fixed to a panel or sub-housing 340 and electronically communicate with two female sockets 336 by seating two conductive plugs or two sets of prongs 339 electrically communicating with the set of LED arrays 328. As shown in FIG. 24, the panel 340 is seated within the troffer 320 and may be used to replace and retrofit current fluorescent tube troffers now in service. As shown in FIG. 25, a plurality of LED arrays 328 is used to provide conventional lighting during normal hours of operation. At least one first LED array/strip 326 is used to provide night lighting and if desired, emergency lighting, in accordance with the present invention. As shown in FIG. 26, the plurality of LED arrays 328 and the first LED array 326 are wired on the backside of the panel 340 in accordance with the block diagram presented in FIG. 27. The circuitry shown in FIG. 26 contains a battery source 350, a rectifier/converter 370, a battery charger 380 if desired, a photo-sensor 384, and an AC sensor 386, wired and configured as shown in FIG. 27. As with other embodiments, the battery charger 380 may be omitted from the circuitry if disposable batteries are used.

It will be understood that the foregoing descriptions of embodiments of the present invention are for illustrative purposes only and should not be construed as limiting the scope of the invention. For example, remote RF switching may be provided from the general power supply thereby providing selective power to the primary light assemblies 21 and the LED array 76. As such, the various structural and operational features herein disclosed are susceptible to a number of modifications commensurate with the abilities of one of ordinary skill in the art, none of which departs from the various permutations described herein or from the invention as claimed in the appended claims.

What is claimed is:

1. A light assembly comprising:
 a troffer adapted to communicate with an alternating current source;
 a tubular bulbless sub-housing contained within said troffer and adapted to electronically communicate with said troffer;
 one or more solid state lighting units contained within said troffer, said one or more solid state lighting units adjacent said tubular bulbless sub-housing and adapted to electronically communicate with said troffer;
 a night light contained within said tubular bulbless sub-housing and adapted to operably communicate with said solid state lighting units, said night light actuated by the absence of light emanating from said one or more solid state lighting units; and
 one or more light emitting diodes contained within said night light and powered by an alternating current or a direct current power supply.

2. The light assembly of claim 1 further comprising:
 a battery source contained within said tubular bulbless sub-housing for powering said night light in the event of power interruption.

3. The light assembly of claim 1 wherein said one or more solid state lighting units are one or more light emitting diodes electronically communicating with said troffer.

4. The light assembly of claim 1 wherein said one or more solid state lighting units are one or more arrays of light emitting diodes, said one or more arrays electronically communicating with said troffer.

5. The light assembly of claim 1 wherein said one or more solid state lighting units are one or more fluorescent tubes, said one or more fluorescent tubes electronically communicating with said troffer.

6. The light assembly of claim 1 further comprising:
a battery charger contained within said tubular bulbless sub-housing, said battery charger operably communicating with said battery source.

7. A lighting unit comprising:
a troffer electronically adapted to communicate with an alternating current source;
a tubular bulbless sub-housing contained within said troffer and adapted to electronically communicate therewith; and
one or more light emitting diodes contained within said tubular bulbless sub-housing and adapted to electronically communicate therewith, said one or more light emitting diodes actuated by the absence of ambient light.

8. The lighting unit of claim 7 further comprising:
one or more solid state lighting units contained within said tubular bulbless sub-housing and actuated by alternating current power.

9. The lighting unit of claim 8 further comprising:
a night light contained within said tubular bulbless sub-housing and adapted to operably communicate with said solid state lighting units, said night light actuated by the absence of light emanating from said one or more solid state lighting units,
wherein at least one of said one or more light emitting diodes is contained within said night light.

10. The lighting unit of claim 9 further comprising:
a battery source contained within said tubular bulbless sub-housing adapted to electronically communicate with said night light for powering said night light in the event of power interruption.

11. The lighting unit of claim 10 further comprising:
a battery charger contained within said housing and actuated by direct current power, said battery charger operably communicating with said battery source.

12. The lighting unit of claim 7 further comprising:
a first end cap at a first end of said tubular bulbless sub-housing for electrical communication with an alternating current source; and
a second end cap at a second end of said tubular bulbless sub-housing for electrical communication with an alternating current source.

13. The lighting unit of claim 7 further comprising:
at least one end cap on an end of said tubular bulbless sub-housing for electrical communication with an alternating current source.

14. The lighting unit of claim 8 wherein said one or more solid state lighting units comprise:
one or more light emitting diode arrays, or, one or more fluorescent tubes.

15. The lighting unit of claim 9 wherein said night light is adapted to be actuated by alternating current, direct current, or both.

16. A lighting unit comprising:
a tubular bulbless sub-housing adapted to communicate with a power source; and
one or more light emitting diodes contained within said tubular bulbless sub-housing and adapted to electronically communicate with said tubular bulbless sub-housing, said one or more light emitting actuated by the absence of light.

17. The lighting unit of claim 16 wherein said power source is either alternating current, direct current, or both.

18. The lighting unit of claim 17 wherein said bulbless sub-housing is a panel adapted to electronically communicate with an alternating current source.

19. The lighting unit of claim 18 further comprising:
one or more arrays of light emitting diodes removably fixed to said panel, said one or more arrays electronically communicating with said panel upon actuation thereof.

20. The lighting unit of claim 16 wherein said bulbless sub-housing has one or more end caps adapted to electronically communicate with said power source to energize said tubular bulbless sub-housing.

* * * * *

UNITED STATES PATENT AND TRADEMARK OFFICE
CERTIFICATE OF CORRECTION

| | | |
|---|---|---|
| PATENT NO. | : 8,896,208 B2 | Page 1 of 1 |
| APPLICATION NO. | : 13/417169 | |
| DATED | : November 25, 2014 | |
| INVENTOR(S) | : Shew | |

It is certified that error appears in the above-identified patent and that said Letters Patent is hereby corrected as shown below:

In the Specification:

Column 7; Line 66; Please delete "1.72" and insert --172--.

Column 8; Line 28 - 33; Please delete:

"Although not shown, it will be appreciated that equivalent circuitry as described by FIG. 10 and as shown in
        FIGS. 5 and 6 as circuit board 35 are provided in light unit 110 thereby coverting or rectifying alternating current to direct current in the same way as described relative to Fig. 10."

and insert:

--Although not shown, it will be appreciated that equivalent circuitry as described by FIG. 10 and as shown in FIGS. 5 and 6 as circuit board 35 are provided in light unit 110 thereby coverting or rectifying alternating current to direct current in the same way as described relative to Fig. 10.--.

Signed and Sealed this
Twenty-fourth Day of March, 2015

Michelle K. Lee
*Director of the United States Patent and Trademark Office*

UNITED STATES PATENT AND TRADEMARK OFFICE
CERTIFICATE OF CORRECTION

PATENT NO. : 8,896,208 B2
APPLICATION NO. : 13/417169
DATED : November 25, 2014
INVENTOR(S) : Shew Page 1 of 1

It is certified that error appears in the above-identified patent and that said Letters Patent is hereby corrected as shown below:

In the claims,

Column 12; Line 25; Claim 16; Please Insert --diodes-- after emitting.

Signed and Sealed this
Twelfth Day of July, 2016

Michelle K. Lee
*Director of the United States Patent and Trademark Office*